United States Patent
Vayanos

(10) Patent No.: US 6,420,999 B1
(45) Date of Patent: Jul. 16, 2002

(54) METHOD AND APPARATUS FOR DETERMINING AN ERROR ESTIMATE IN A HYBRID POSITION DETERMINATION SYSTEM

(75) Inventor: Alkinoos Vayanos, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/697,781

(22) Filed: Oct. 26, 2000

(51) Int. Cl.$^7$ .............................. G01S 5/02; H04B 7/185
(52) U.S. Cl. ............................ 342/357.03; 342/357.02; 701/214; 701/215
(58) Field of Search ...................... 342/357.03, 357.02; 701/214, 215

(56) References Cited

U.S. PATENT DOCUMENTS 5,828,336 A * 10/1998 Yunck et al.
5,913,170 A * 6/1999 Wortham .................... 455/457
5,995,043 A * 11/1999 Murphy ................ 342/357.03
6,075,987 A * 6/2000 Camp, Jr. et al. ........... 455/427

* cited by examiner

Primary Examiner—Theodore M. Blum
(74) Attorney, Agent, or Firm—Philip Wadsworth; Charles D. Brown; Bruce W. Greenhaus

(57) ABSTRACT

A method and apparatus that allows correlations between a selected parameter and the error in a pseudo range measurement to be exploited. A database is established in which the amount of error estimated for particular pseudo range measurements to a beacon is maintained. Clusters are defined. Each cluster is associated with a range of values for the selected parameter. Pseudo range measurements are then associated with a particular cluster based upon the value of the selected parameter at the time (or proximate to the time) the pseudo range measurement was taken. As more estimates of the pseudo range measurements are made, the size of the clusters (i.e., the range of values of the selected parameter) can be reduced. Due to the correlation between the selected parameter and the errors in the pseudo range measurements, reducing the size of the clusters reduces the variance of the error estimates. The mean value of the error estimates is used to correct the error in future pseudo range measurements.

30 Claims, 8 Drawing Sheets

METHOD AND APPARATUS FOR DETERMINING AN ERROR ESTIMATE IN A HYBRID POSITION DETERMINATION SYSTEM

BACKGROUND OF THE INVENTION

I. Field of the Invention

The current invention relates to position determination. More specifically, the present invention relates to a method and apparatus for improving error estimates of a position determination measurement made when determining the position of a device.

II. Description of the Related Art

It has always been desirable for man to know his geographic location. Devices ranging from compasses, maps, sextants, surveying equipment, etc. have been used to determine a person's location. Today, we enjoy the benefits of a system of satellites that orbit about the earth and that provide information to receivers on earth. Each such receiver can use the information provided by the satellites to determine its position. One such system is the well know Global Positioning System (GPS). GPS is a "constellation" of 24 well-spaced satellites that orbit the Earth. The accuracy with which GPS can determine the position of a GPS receiver is anywhere from 100 to 10 meters for most receivers. Each satellite within the constellation of GPS satellites transmits signals encoded with information. The information allows receivers on earth to measure the time of arrival of the received signals relative to an arbitrary point in time. This relative time of arrival measurement is generally referred to is a "pseudo-range" measurement.

GPS is owned and operated by the U.S. Department of Defense, but is available for general use around the world. Briefly, GPS includes 21 "regular" satellites and three spare satellites in orbit at 10,600 miles above the Earth. The satellites are spaced so that from any point on Earth, at least four satellites will be above the horizon. Each satellite contains a computer, an atomic clock, and a radio. With an understanding of its own orbit and the clock, each satellite continually broadcasts its changing position and time. Once a day, each satellite checks its own sense of time and position with ground stations and corrects the information as necessary. On the ground, each GPS receiver contains a computer that "triangulates" its own position by getting bearings from three satellites for a two dimensional solution. The result is provided in the form of a geographic position. This position is typically in the form of longitude and latitude. The accuracy of the position determination is typically within 100 meters. If the receiver is also equipped with a display screen that shows a map, the position can be shown on the map. If a fourth satellite can be received, the receiver/computer can figure out the altitude as well as the geographic position. If the receiver is moving, that receiver may also be able to calculate the speed and direction of travel of the receiver and give an estimated time of arrival to specified destinations.

Unfortunately, signals from GPS satellites are received at very low power levels due to the relatively large distances between the transmitting satellites and the receivers. Therefore, minimal obstructions in the signal path that either block or disperse the signal make it impossible for receivers to receive the signals. For example, most GPS receivers have great difficulty receiving signals inside a building, under dense foliage, in urban settings in which tall buildings block much of the sky, etc. Accordingly, other techniques are used in place of, or to supplement, GPS. One such system is commonly referred to as a "hybrid position determination" system.

A hybrid position determination system includes a position determination terminal that includes both a GPS receiver and a communication system receiver. In one example of such a hybrid position determination system, the communication system receiver is a cellular telephone receiver. A position determination beacon within the communication system communicates with the hybrid position determination terminal.

Signals from GPS satellites are received when available by the hybrid position determination terminal via the GPS receiver. "Aiding information" is received from the position determination beacon by the hybrid position determination terminal via the communication system receiver. The aiding information includes information that allows GPS satellite signals to be rapidly located in frequency and time. In addition, the communication system signals can also be used to determine pseudo-ranges to base stations, one or more of which may be a position determination beacon. The pseudo-ranges to the base stations are used together with the pseudo-ranges to the satellites to calculate the position of the receiver.

In addition, base stations provide a time reference to the position determination receiver within the hybrid position determination terminal. In one particular hybrid system, the time reference provided to the receiver by the communication system is GPS time. However, the GPS time that is provided is offset by the amount of time required for the signal communicating the GPS time to propagate from the position determination beacon to the position determination receiver. This offset can be determined by measuring the propagation delay encountered by a signal that is transmitted on a "round trip" from the communication system receiver to the position determination beacon and back to the communication system receiver. The offset is then equal to one half of the total round trip delay (RTD). However, it should be noted that there is a delay that is added to the RTD by the internal delays associated with the reception and retransmission of the signal at the position determination beacon. Therefore, in order to get an accurate GPS time transfer from the position determination beacon to the position determination terminal, these internal delays must be determined and subtracted from the measured RTD. This is often referred to as "calibrating" the position determination beacon. Calibrating the position determination beacon requires measuring the amount of delay internal to the position determination beacon. Calibrating the position determination beacons is a time consuming and difficult task. Accordingly, it would be advantageous to provide a method and apparatus that would allow the position of a hybrid position determination terminal to be determined without requiring calibration of position determination beacons.

Even after having calibrated each of the position determination beacons within a communication system, the accuracy of the pseudo-range measurements that are made between the position determination terminal and the position determination beacon are not necessarily accurate. This is due to a phenomenon known as "multipathing". Multipathing occurs when a signal takes an indirect path between the transmitter (i.e., the position determination beacon) and the receiver (i.e., the position determination terminal). An indirect path is defined as a path that is longer than the shortest distance between the transmitter and receiver. The word multipathing implies that more than one signal path will be traversed by the signal between the transmitter and receiver. However, for the purposes of this discussion, a signal would still be considered to be a multipath signal, even if the signal takes only one indirect path between the transmitter and the receiver.

Multipathing increases the amount of time required for the signal to traverse the distance between the position determination beacon and the position determination terminal. This increase is due to the longer distance traveled by the signal as a consequence of reflections off obstacles, such as buildings. The increase in the amount of time required for the signal to arrive at the receiver results in an error in the pseudo-range measurement. This pseudo-range measurement error is then translated into an error in the position that is calculated from the pseudo-range measurements.

Multipathing can be a problem in GPS signals. However, it is easier to mitigate the effects of multipathing in GPS signals, since it is likely that the signal will still arrive at the position determination terminal via the direct path. That is, the signal between the GPS satellite and the position determination terminal is likely to take more than one path. However, one of those paths is likely to be the direct path. Accordingly, the direct path is assumed to be the one that is first to arrive. In addition, the direct path typically will have greater signal strength. In contrast, communication signals transmitted from a position determination beacon are more likely to take only indirect paths.

Therefore, there is a need to determine the error that is introduced by multipathing. The following description discloses a method and apparatus for determining an estimate of the amount of en-or that is present in pseudo-range measurements made in a hybrid position determination system.

SUMMARY OF THE INVENTION

The presently disclosed method and apparatus allows correlations between a selected parameter and the error in a pseudo range measurement to be exploited. A database is established in which the amount of error estimated for particular pseudo range measurements to a beacon is maintained. Clusters are defined. Each cluster is associated with a range of values for the selected parameter. Pseudo range measurements are then associated with a particular cluster based upon the value of the selected parameter at the time (or proximate to the time) the pseudo range measurement was taken. As more estimates of the pseudo range measurements are made, the size of the clusters (i.e., the range of values of the selected parameter) can be reduced. Due to the correlation between the selected parameter and the errors in the pseudo range measurements, reducing the size of the clusters reduces the variance of the error estimates. The mean value of the error estimates is used to correct the error in future pseudo range measurements.

In one embodiment of the disclosed method and apparatus, the position of a terminal that measures the pseudo range to a beacon is the selected parameter. Alternatively, any other correlated parameter, such as the power level of the beacon signal, may be the selected parameter. The size of the cluster is initially relatively large, since the database will have relatively few error estimates in any particular geographic region. However, as the number of error estimates increases, the size of the clusters can be decreased, thus reducing the variance of the error estimates within the smaller clusters with respect to the larger clusters.

In accordance with one embodiment, error estimates are made by first calculating what the pseudo range to a particular beacon should be. This calculation is made by determining (using a highly accurate first position determination sub-system) the current position of the terminal used to make the pseudo range measurements to the beacon. Once the position of the terminal is known, the pseudo range measurements to a beacon can easily be calculated, assuming that the location of the beacon is known. The pseudo range to the beacon from the terminal is then measured using a less accurate second position determination sub-system. The difference between the pseudo range that is calculated based on the more accurate first position determination sub-system and the pseudo range measurement made by the less accurate second position determination sub-system is determined. This difference is assumed to be due to the error in the measurement made by the less accurate second position determination sub-system.

Accordingly, the database includes information that allows pseudo range measurements made by the less accurate second position determination sub-system to be corrected when the more accurate first position determination sub-system is not available. The database is self generating, in that the information required in the database is taken during the operation of the terminal based upon the availability of the more accurate first position determination sub-system. The more points the terminal can locate using the more accurate first position determination sub-system, the smaller the clusters in the database. As a consequence of smaller clusters, the variance in the error estimates that are maintained in the database for each cluster will be reduced.

It should be understood that the presently disclosed method and apparatus could be used with position determination systems other than hybrid position determination systems if there is some other means by which to determine the position of the terminal and that means is available at some times or locations, but not at others. In that case, the position of the terminal would be used as a reference to determine the amount of error in the pseudo range measurements in the same way as the position determination from the more accurate sub-system described above.

In accordance with one embodiment of the disclosed method and apparatus, an iterative approach is used when the selected parameter is the location of the terminal. Assuming that the more accurate first position determination sub-system is not available, and that a sufficient number of initial error estimates have been made, the iterative approach uses corrected measurements of the pseudo range based upon a relatively large cluster to determine the position of the terminal. Once the location of the terminal has been determined in this way, the corrections to the pseudo ranges can be recalculated based upon a much smaller cluster, assuming that a statistically valid number of error estimates has been made for the smaller cluster.

BRIEF DESCRIPTION OF THE DRAWINGS

The features, objects, and advantages of the present invention will become more apparent from the detailed description set forth below when taken in conjunction with the drawings, in which like reference characters identify like elements in the figures throughout and wherein.

DETAILED DESCRIPTION OF PREFERRED EMBODIMENTS

Figure 1:
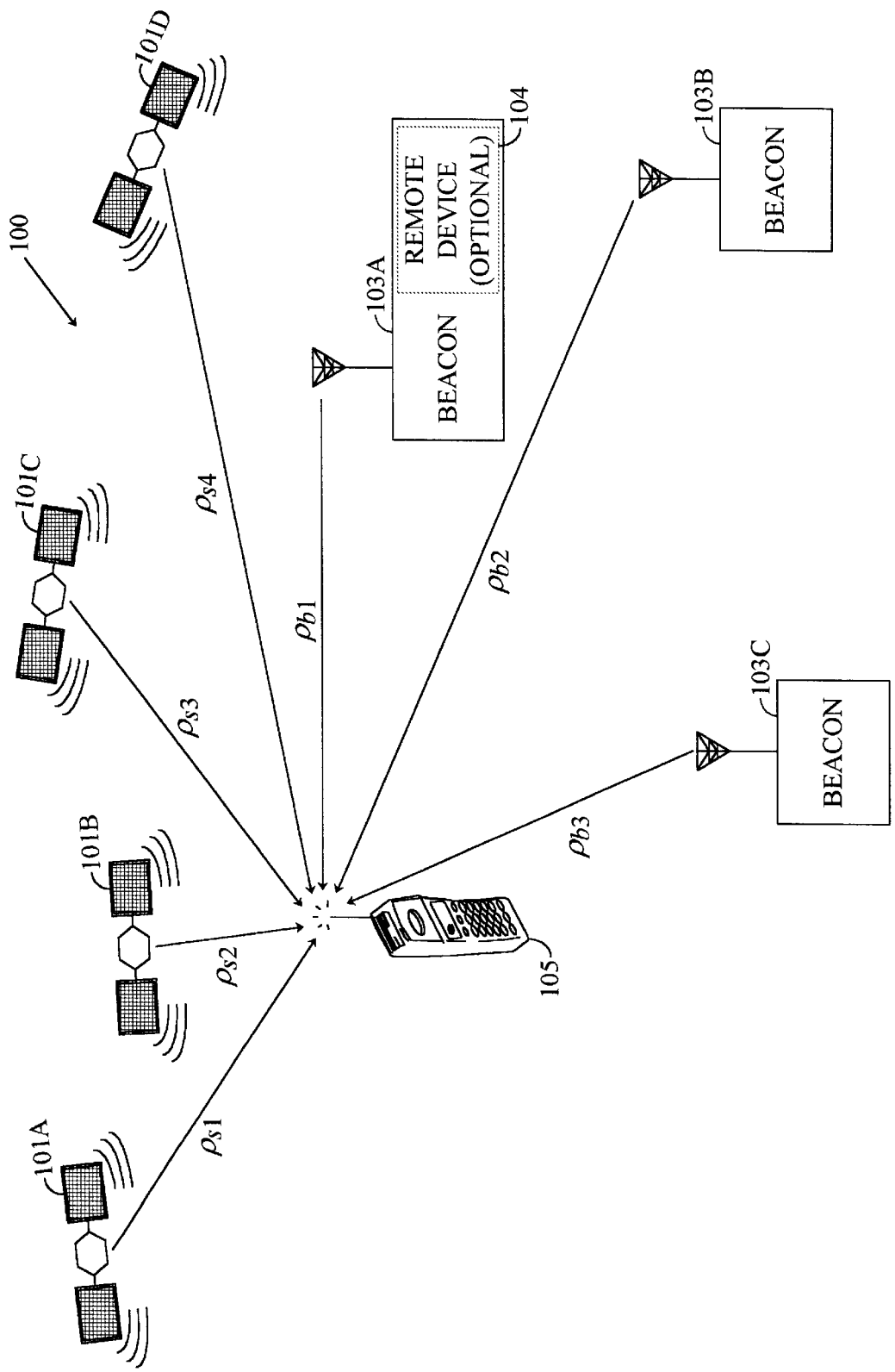
FIG. 1 is an illustration of a hybrid position determination system in accordance with the disclosed method and apparatus.

FIG. 1 is an illustration of a hybrid position determination system 100. For the purpose of this disclosure, a hybrid position determination system is defined as a system in which the position of a terminal 105 can be determined from a first position determination sub-system alone or in combination with a second sub-system. The first position determination sub-system is preferably capable of determining the position of the terminal 105 "independent" of the second sub-system. In the present context, the phrase "independent of the second sub-system" means that the first sub-system may be used to determine the position of a terminal at times when some or all of the components of the second sub-system are not available. However, in accordance with one embodiment of the presently disclosed method and apparatus, components of the second sub-system may be a necessary part of the first sub-system. It should be noted that the second sub-system may or may not be capable of performing a position determination without the use of components of, or information from, the first subsystem.

Furthermore, in a hybrid position determination system in accordance with the presently disclosed method and apparatus, at least one "parameter" is related to the magnitude of the errors in position determination measurements of one of the position determination sub-systems. For the purpose of this disclosure, a parameter is any variable that is related to the magnitude of the errors in position determination measurements of one of the position determination sub-systems. For example, a parameter for a position determination terminal 105 can be: (1) the location of the position determination terminal 105, (2) the amount of power in a position determination signal received by the position determination terminal 105, (3) the number of base stations that are present in the geographic region in which the position determination terminal 105 is presently located, (4) the type of buildings in the geographic region in which the position determination terminal 105 is presently located, (5) the density of the structures in the geographic region in which the position determination terminal 105 is presently located, etc. Each of these variables will effect the accuracy of the measurements made by a position determination terminal within a terrestrial position determination system, and can therefore be considered to be a parameter for the position determination terminal 105. However, a parameter which is related to the magnitude of the errors in measurements made by the second sub-system is preferably unrelated (and alternatively, weakly related) to the magnitude of the errors in measurements made by the first position determination sub-system.

In one example of a hybrid position determination system including two subsystems, each of the two sub-systems includes a set of transmitters. The transmitters of each sub-system transmit position determination signals. In such a hybrid system, it is not necessary for transmissions from both sub-systems to be available at the same time. In the embodiment depicted in FIG. 1, four satellites 101, three position determination beacons 103, and one position determination terminal 105 are shown. The satellites 101 are a first of the two types of transmitters of position determination signals and are associated with the first sub-system.

The satellites 101 provide signals that can be received by the terminal 105. The received signals enable the terminal to determine the position of the terminal 105 without the need to receive position determination signals from any of the beacons 103, assuming that signals from a sufficient number of satellites signals are received and that the information received on those signals can be decoded. Nonetheless, in some embodiments of the disclosed method and apparatus, the terminal 105 may require communication with a beacon 103 for acquisition and processing assistance. Whether acquisition assistance is desirable or not, once a sufficient number of satellites 101 are acquired, the information provided by the satellites 101 is sufficient to calculate the position of the terminal 105.

The beacons 103 are a part of a second of the two position determination subsystems. Like the satellites 101, the beacons 103 provide signals that can be received by the terminal 105. In accordance with one embodiment of the disclosed method and apparatus, the signals enable the terminal 105 to determine its own position without the need to receive position determination signals from any of the satellites 101. However, in an alternative embodiment, the second sub-system requires at least one transmitter from the first sub-system to provide information in order to determine the position of the terminal 105. Once the information is received from each of the required transmitters, a determination of the position can be performed by the terminal 105, either alone or with acquisition and processing assistance from one of the beacons 103. Alternatively, the position of the terminal 105 can be determined by a device (not explicitly shown) that is remote from the terminal 105. In this case, the terminal 105 transmits any information necessary to determine the position of the terminal 105 to the remote device. In one embodiment of the disclosed method and apparatus, the remote device is one of the beacons 103 or a sub-system 104 within one of the beacons 103. The remote device is shown in FIG. 1 as "optional" to highlight the fact that the remote device may be located either in the beacon 103 or external to the beacon 103.

It will be understood by those skilled in the art that there may be more or less satellites 101 or beacons 103 than are shown in FIG. 1, and that there may be more than one terminal 105. In one embodiment of the hybrid position determination system 100, the satellites 101 are GPS satellites. However, in an alternative embodiment of the hybrid position determination system 100, the satellites 101 may be any other type of transmitter that enables a relatively independent and relatively accurate position determination to be made. For example, a terrestrial position determination system (such as LORAIN) that is capable of providing an accurate position determination may be used instead of satellites.

In one embodiment of the hybrid position determination system 100, the beacons 103 are cellular base stations, including (1) base station transceiver sub-systems (BTSs), (2) base station controllers (BSCs), and (3) position determination equipment (PDEs). However, it will be understood that in other embodiments, the beacons 103 may include a subset of these components. Furthermore, the beacons 103 may be any other transmitters capable of transmitting position determination signals to enable the position of a terminal 105 to be determined. It should also be understood by those skilled in the art that in a beacon 103 that includes a PDE, the PDE would likely serve as the remote device 104 shown in FIG. 1.

In accordance with the presently disclosed method and apparatus, information received from the first type of transmitters should enable a substantially more accurate position determination to be calculated than can be determined from the information received from the second type of transmitters. For example, in the case of GPS satellites and cellular base stations, the accuracy of the position determination made using measurements to the satellites is typically greater than the accuracy of the position determinations made using measurements to the cellular base stations.

For the purpose of clarity, the presently disclosed method and apparatus will be described in the context of a hybrid position determination system in which the satellites are GPS satellites and the beacon is a code division multiple access (CDMA) cellular base station. However, as noted above, the present invention does not rely upon any of the unique features of these systems. Accordingly, the invention may be implemented using any other systems for determining position.

In the embodiment in which the satellites are GPS satellites and the beacons are CDMA cellular base stations (which may or may not include a BSC and PDE) "pseudo range" measurements $\rho_{s1}$–$\rho_{s4}$ are made with respect to the satellites 101 and similarly, pseudo range measurement $\rho_{b1}$–$\rho_{b3}$ are made with respect to the beacons 103. Pseudo range measurements represent the relative distance between the receiving terminal 105 and the sources of position determination signals. It should be noted that the particular manner in which position determinations are made is not relevant to the presently disclosed method and apparatus. However, a discussion of pseudo range based position determination techniques is provided as an example of one embodiment of the disclosed method and apparatus. Other means for measuring pseudo ranges are well known and could be used to perform the disclosed method and apparatus. Furthermore, other means for determining position without the need for pseudo range measurements are well known and could be used to perform the disclosed method and apparatus.

Pseudo range measurements typically represent a time difference between an arbitrary point in time and the time at which a signal arrives at a position determination terminal 105. However, pseudo ranges are typically presented in units of meters. The amount of time can be translated into a distance in meters by multiplying the time difference by the speed of light in meters per second.

In one embodiment of the disclosed method and apparatus in which the beacon 103 is a CDMA base station, the position determination terminal notes when the beginning of a series of bits that make up a spreading code for the CDMA signal has been received with respect to a prior arbitrary point in time. This series of bits is commonly referred to as a "pseudo-random noise (PN) spreading code".

It should be noted that the signals transmitted by each of the base stations within a CDMA communications system are encoded with the same PN spreading code. However, there are offsets in time between the start of the code transmitted from one base station with respect to the start of the code transmitted from each other base station. Therefore, these offsets must be taken into account before comparing the relative timing of the signals received from each of the beacons 103 with respect to one another. As is well known, these offsets are easily determined and can be subtracted out. In fact, these offsets are typically used to identify the particular base station from which the signal originated.

Furthermore, it should be noted that the duration of the clock (assumed for this example to be one millisecond) must be such that any ambiguity can be resolved. That is, the duration of the clock must be such that the values of the clock that are associated with the received signals should uniquely identify only one relationship between the received signals. Accordingly, the duration of the clock must be much greater than twice the difference between the time at which the signals will be received from each beacon 103, taking into account the offsets in the timing of the codes transmitted by each beacon 103. It should be noted that making pseudo range measurements is very well known in the art.

If the positions are known for at least three of the beacons 103 from which pseudo range measurements are taken, then the pseudo range measurements can be used to determine the position of the terminal 105. The pseudo range measurements and the position of the beacons 103 are applied to a well-known process commonly referred to as the "Least Mean Squares" (LMS) process. Likewise, the inverse is true. That is, if the position of the terminal 105 and three beacons 103 are known, the distance between the terminal 105 and each of the three beacons 103 can be used to determine the pseudo range values from the position of the terminal 105 to the beacons 103.

The presently disclosed method and apparatus takes advantage of the fact that a hybrid position determination system will frequently have two independently derived sets of pseudo range measurements. One set of measurements is typically going to be more accurate than the other. Therefore, if the more accurate set of measurements is sufficient to determine the position of the terminal 105, then the more accurate set of measurements can be used to determine the error in the less accurate set of measurements. Furthermore, it has been determined that there is a predictable relationship between particular parameters (such as position of the terminal 105) and the amount of error in the less accurate set of measurements. Therefore, by knowing both the value of the parameter and the amount of error associated with that parameter, an estimate as to the amount of error in the less accurate measurements can be made. For example, by knowing the approximate position of the terminal 105 and the relationship between the position and the amount of error, the amount of error in the less accurate measurement can be estimated.

In order to take advantage of the relationship between a particular parameter and the amount of error in the less accurate pseudo range measurements, a "Measurement Statistics Database" (MSD) is generated in accordance with one embodiment of the presently disclosed method and apparatus. It should be noted that means other than a database may be used for associating the values of a parameter with the amount of error in the measurements made by the less accurate position determination sub-system.

However, the MSD provides an effective means by which a parameter (such as the position of terminal 105) can be associated with a correction factor to be applied to the less accurate pseudo range measurements. Accordingly, when the value of the parameter is known, the associated correction factor can be determined from the MSD and applied to the pseudo range measurement.

The following example describes the presently disclosed method and apparatus in the case in which the parameter at issue is the position of the terminal 105 as determined from essentially uncorrected pseudo range measurements made by the terminal 105. In one embodiment of the presently disclosed method and apparatus, the pseudo range measurements are completely uncorrected. However, it will be clear to those skilled in the art that some corrections may be made to the pseudo range measurements without deviating from the scope of the presently described method and apparatus. For example, the pseudo range measurements may be corrected for time offsets due to differences between the time at which the same code is transmitted from different beacons.

It will also be clear to those skilled in the art that the parameter at issue may be any one of a large number of other parameters. It should be noted that it is advantageous for the terminal 105 or the beacon 103 to be able to directly measure the value of the parameter at issue. Direct measurement of the parameter by the terminal 105 or the beacon 103 allows the disclosed method and apparatus to operate without input from an external source. However, it is possible for the value of the parameter to be input by an external source, such as the terminal operator or signals received from a remote source.

Possible parameters include, but are not limited to: (1) the amount of power with which the position determination signals have been received by the terminal 105; (2) the type of buildings that are proximate to the terminal 105; (3) the amount of urban development in the general vicinity of the terminal 105; (4) the distance from the beacons 103 to the terminal 105 that will be receiving the position determination signals; and (5) the shape of the correlation peak determined from the correlation of the received signal with a known PN spreading code. It should be clear that this list merely provides a small sample of the many types of parameters that could be used to predict the amount of error that is likely to be present in pseudo range measurements. The present invention should not be limited to the types of parameters that are listed herein. Rather, the scope of the present disclosure should be considered to include using any parameter that is correlated with a first set of pseudo range measurements and not (or alternatively, to a lesser degree) with a second set of pseudo range measurements to predict the amount of en-or in the first set of measurements.

Generation of an MSD

Figure 2:
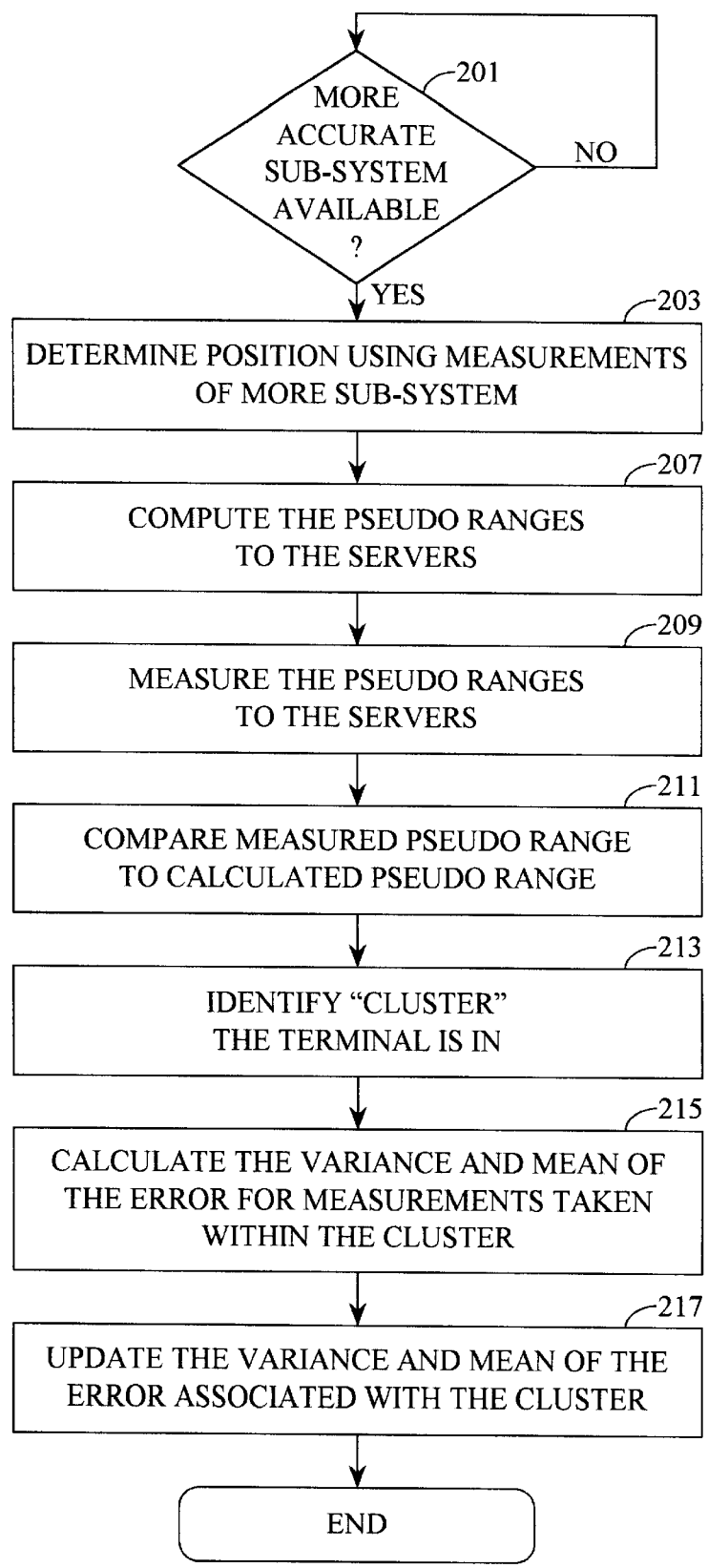
FIG. 2 illustrates the disclosed method in which there is a relation between the approximate position of a terminal and the expected error in pseudo range measurements made by the terminal.

The process for generating an MSD is illustrated in FIG. 2. FIG. 2 particularly relates to the example in which there is a relation between the approximate position of a terminal 105 and the expected error in pseudo range measurements made by the terminal 105.

Initially, a determination is made as to whether the more accurate position determination sub-system is available (STEP 201). If so, then the position of the terminal 105 is determined by using only measurements from the more accurate position determination sub-system (STEP 203). The process of generating the MSD requires that the more accurate position determination capability be available. If not available, then the process of generating an MSD can go no further until the more accurate position determination capability becomes available. Nonetheless, it should be understood that in this case, the MSD, if already sufficiently generated, can be used to estimate the error in the less accurate sub-system.

In one embodiment of the presently disclosed method and apparatus, the terminal 105 has the ability to determine position based upon either pseudo range measurements to satellites 101 or pseudo range measurements to beacons 103. The pseudo range measurements to the satellites 101 tend to be more accurate. Therefore, in such an embodiment, the position of the terminal 105 is determined using pseudo ranges to the satellites 101, if possible. In an alternative embodiment, the beacon pseudo ranges are used only to supplement the satellite pseudo range measurements when an insufficient number of satellites 101 are available. However, similar to the case in which the beacon pseudo ranges can be used with a satellite to determine the position of the terminal 105, using satellite pseudo ranges is preferred over using beacon pseudo ranges.

The position of the terminal 105 is determined from pseudo ranges to the satellites 101 in essentially the same way as described above with respect to the determination of pseudo ranges from the beacons 103. Greater accuracy in the pseudo range measurements to the satellites 101 than can typically be had from the beacons 103 comes from several factors, including the fact that the satellites 101 are overhead. The probability that the signals received from the satellites 101 will reach the terminal 105 on a direct path is greater than the probability that the signals from the beacons 103 will reach the terminal 105 directly. The failure of the signals from the beacons 103 to reach the terminal 105 directly adds to the distance along the path propagated by the signals from the beacon 103 to the terminal 105. The additional distance causes an error in calculating the position of the terminal 105 when using the pseudo ranges from the beacons 103.

Once the position of the terminal 105 has been determined using the more accurate position determination sub-system, the pseudo ranges to the beacons 103 can be computed (STEP 207). It can be seen that the expected pseudo range to a particular beacon 103 can be easily determined from knowledge of the position of the terminal 105 and from knowledge of the position of the beacon 103. In one embodiment of the disclosed method and apparatus, the pseudo ranges are provided to the beacon 103, which determines the expected pseudo ranges for a particular terminal 105 to a particular beacon 103. If the terminal does the determination and calculation, then the presently disclosed method and apparatus assumes that the terminal 105 has access to knowledge of the position of the beacons 103. For example, in a system in which the beacons 103 are CDMA base stations, the base stations provide the terminal 105 with information regarding their own position. Alternatively, the terminal 105 maintains a database that provides the terminal 105 with the position of the beacon 103 based upon an identification indication received as part of the transmissions from the beacon 103 to the terminal 105. In yet another embodiment of the disclosed method and apparatus, the terminal 105 sends information to one or more of the beacons 103 to process. The beacon 103 knows or has access to the location of the beacons in the area.

The terminal 105 then measures the pseudo ranges to each beacon 103 (STEP 209). Each measured pseudo range is associated with one beacon 103 and is compared to a pseudo range associated with that beacon 103 as computed in STEP 207 (STEP 211). It is assumed that the difference between a computed and measured pseudo range is an error in the measured pseudo range. It should be clear that the pseudo ranges to the both beacons 103 and the satellites 101 can be measured and sent to the beacon 103 for processing prior to the calculation in STEP 207 of the beacon pseudo ranges.

Once the error in the measured pseudo ranges to the beacons 103 has been determined, the "cluster" in which the terminal 105 is presently located is determined (STEP 213). A cluster can be defined in a number of ways. In accordance with the preferred embodiment, a cluster is defined as a set of contiguous values of the parameter. For example, if the parameter is the position of the terminal 105, then the cluster would be a contiguous geographic region. The set of contiguous parameter values is preferably large enough to include several error measurements. That is, preferably enough error estimates have been made within the cluster to calculate with reasonable accuracy, the mean of the pseudo range errors made by the less accurate subsystem at any position within the cluster.

If there are an insufficient number of error estimates, then the size of the cluster is increased to include more error estimates. Alternatively, the cluster will be considered to be immature until a statistically sufficient number of error estimates are made. At the point at which enough error estimates have been made to support two clusters, the cluster is divided into two. Each cluster should have a sufficient number of error estimates to allow the calculated mean of the error associated with that cluster to reflect with reasonable accuracy the mean that would be calculated firm an essentially infinite number of error estimates taken from within the cluster. If the mean of the errors in contiguous clusters are the same, then those clusters may be combined, even though there are sufficient number of error estimates to support more than one cluster. However, in accordance with one embodiment of the disclosed method and apparatus, the cluster may be divided differently if such a division would result in two clusters, each having a sufficient number of error estimates and different error estimate means.

The desired result is to associate each cluster with a value, or set of values, of a parameter. If the value of the parameter detected by the terminal 105 is associated with the cluster, then the terminal 105 is assumed to be in the associated cluster. For example, if the parameter is the position of the terminal 105, then the cluster would be associated with a range of geographical positions. If the terminal 105 is detected to be located within a cluster, then the terminal 105 is considered to be within that cluster for the purposes of the disclosed method and apparatus. Alternatively, assume that the parameter of interest is the power level of the received signal. If the terminal 105 detects that the received signals are within the range of power levels associated with a particular cluster, then that terminal 105 would be considered to be within the associated cluster.

The parameter is selected such that there is a correlation between the parameter and the amount of error in the pseudo range measurements made by the less accurate position determination sub-system. Accordingly, each value of the parameter is associated with a particular value in the error in the position determinations made by the less accurate position determination sub-system. That is, whenever the terminal 105 notes that the parameter has a particular value (or is within a particular range of values), the error in the determination of the position made by the less accurate position determination sub-system will be a particular value (or within a particular range of values).

Refer again to the example in which the position of the terminal 105 is the parameter of interest. Each position of the terminal 105 would be associated with a particular amount of error in the position determination measurement made by the terminal 105 using the less accurate position determination sub-system. Accordingly, to select position as an appropriate parameter, each position of the terminal 105 must be related to a particular amount of error in the position determination measurement made by the less accurate position determination sub-system. Accordingly, for a terminal at position X the amount of error would be Y. This error value would be essentially constant and predictable, within a range of tolerable uncertainty.

Figure 3:
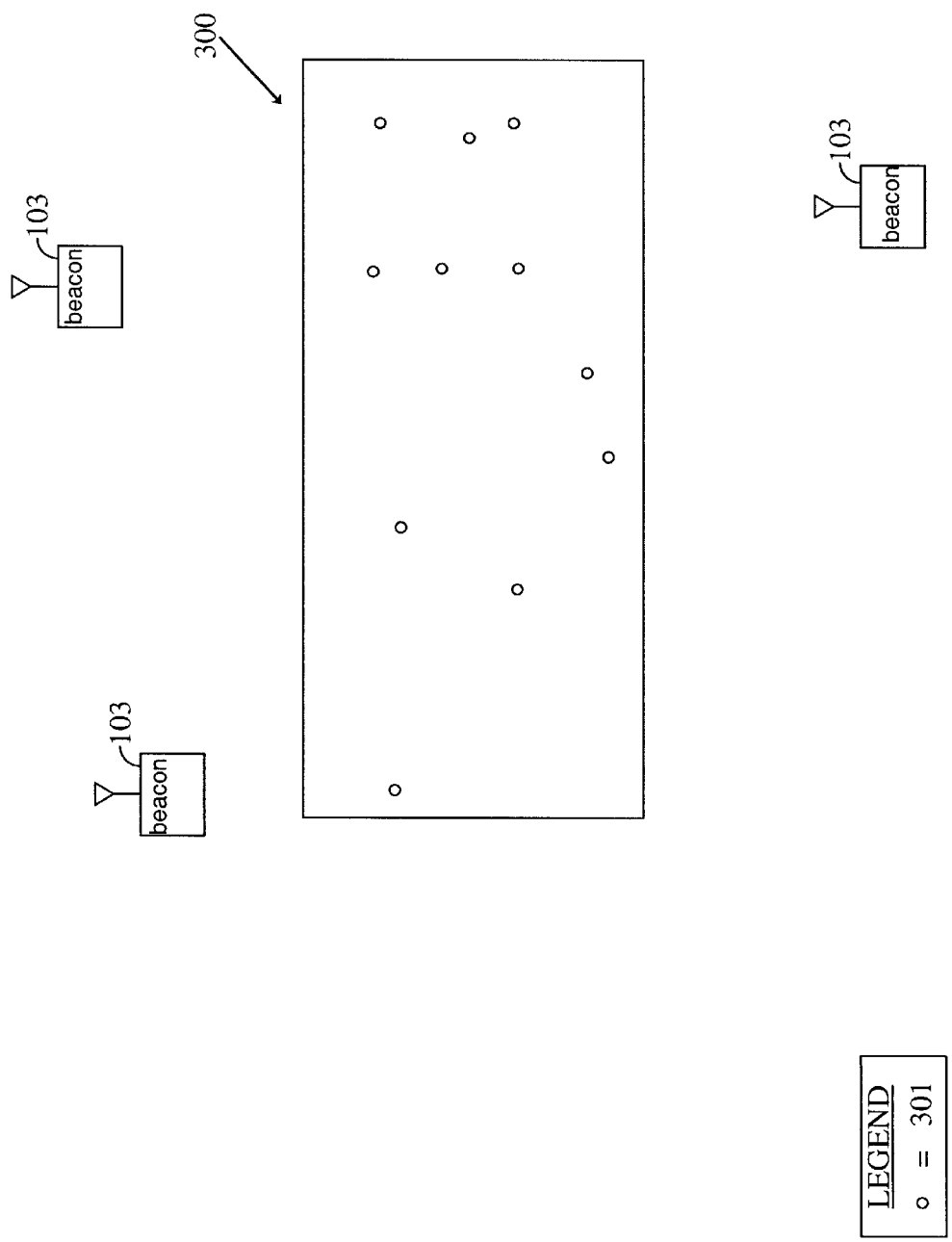
FIG. 3 is an illustration of an entire region shown as a single cluster.
Figure 4:
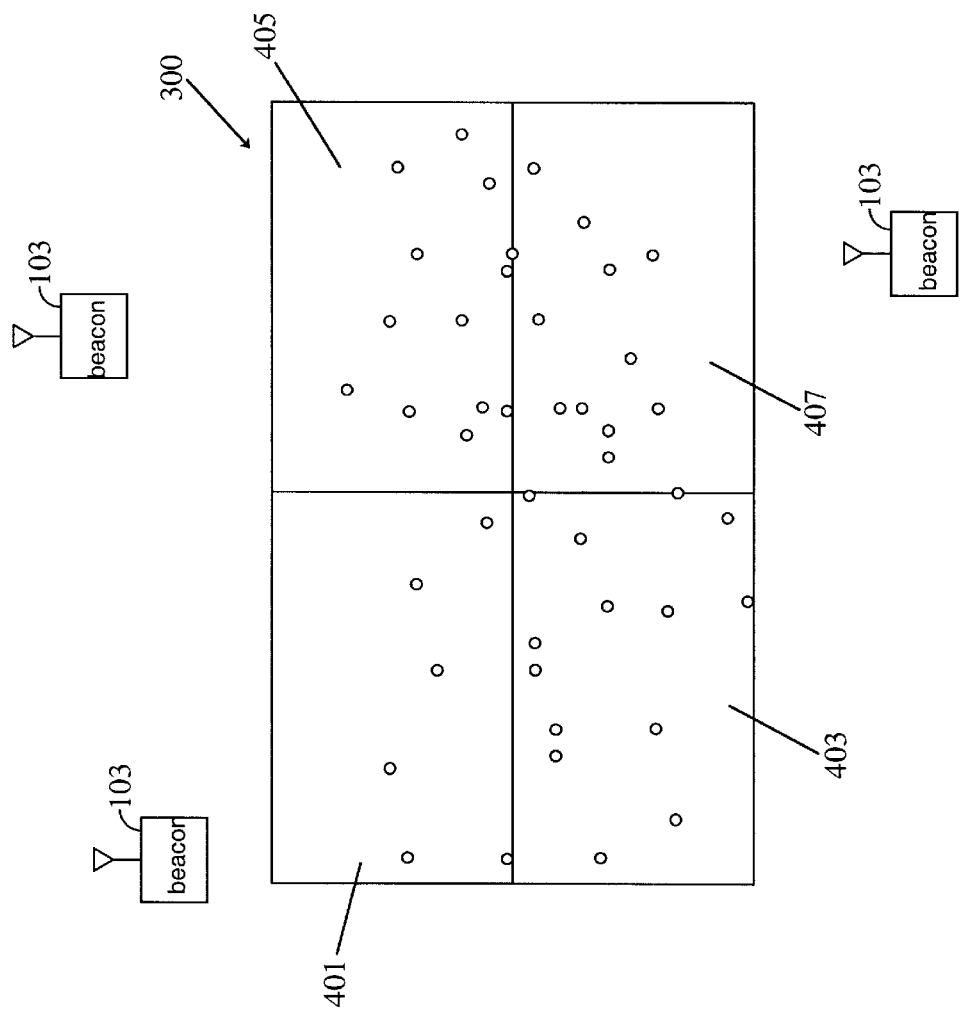
FIG. 4 is an illustration of four smaller clusters that have been subdivided from one larger cluster.

As a more explicit example, refer to FIGS. 3 and 4. A region 300 is shown in which Eleven positions 301 are identified. Pseudo range error estimates were made at each of these positions 301. The error estimates are based upon the difference between pseudo range measurements taken at those locations 301 and pseudo ranges calculated from a knowledge of the position based on the more accurate position determination sub-system.

FIG. 3 is an illustration of the entire region 300 shown as a single cluster. This is so because initially there are only relatively few (eleven) error estimates made in the region 300. It should be noted that the particular number of estimates that is required to constitute a sufficient number depends on the particular application. Therefore, the number may be much greater or less than eleven depending upon the application. It should also be noted that while the beacons 103 are shown in FIG. 3 to be outside the region 300, the positional relationship between the beacons 103 and the region is not relevant to the present invention other than noting that it should be possible to receive the signals from the beacons 103 from within the region 300.

Over time, additional error estimates are made at various locations 302 within the region 300. As these additional error estimates are made at locations 400, a sufficient number of error estimates may be available in portions of the cluster to allow the cluster to be subdivided into smaller clusters. FIG. 4 is an illustration of four smaller clusters 401, 403, 405, and 407 which have been subdivided from one larger cluster 300.

Figure 5:
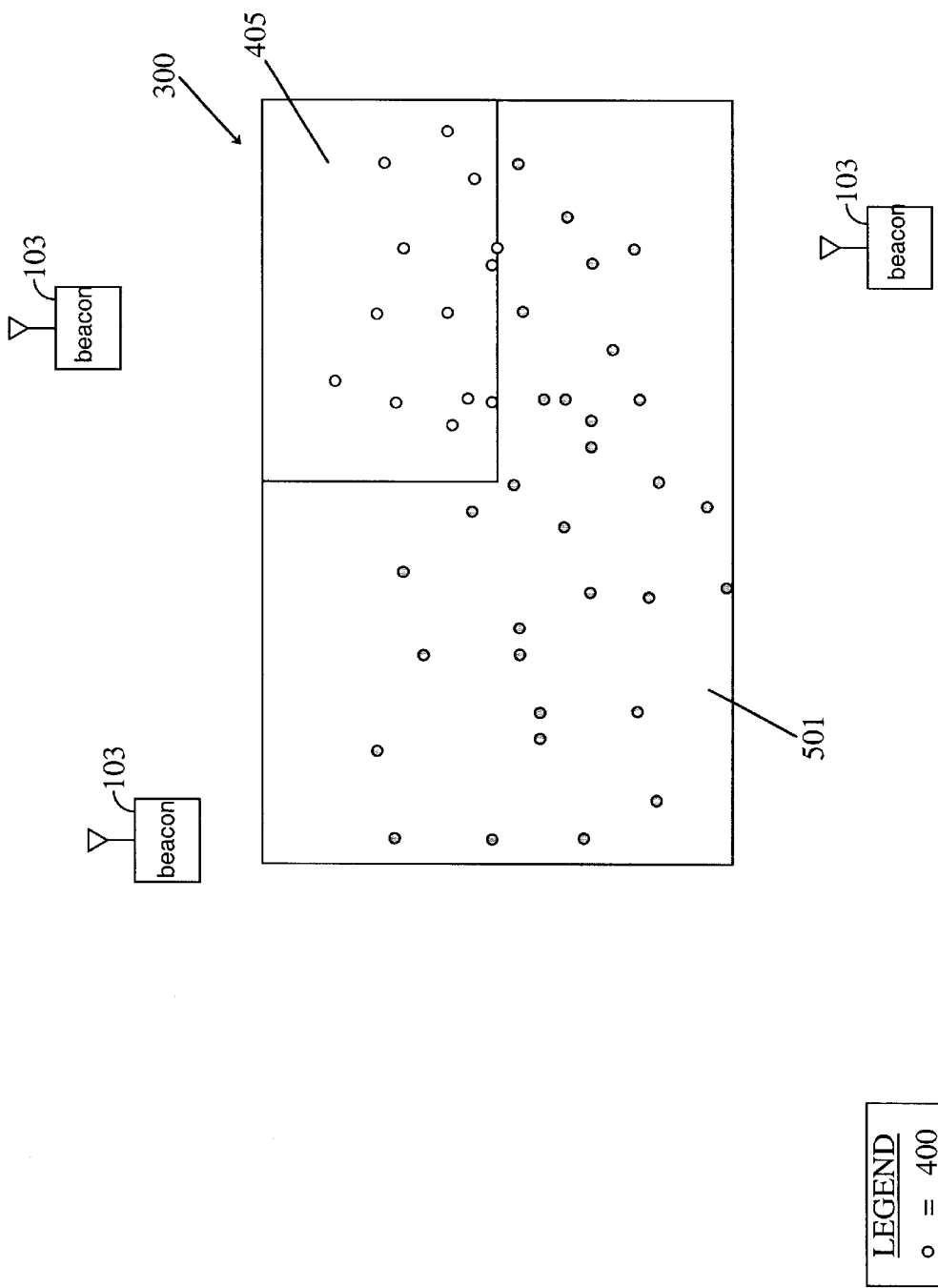
FIG. 5 is an illustration of an example in which some of the clusters of FIG. 4 have been combined to form a new cluster.

The mean of the errors in the pseudo range measurements made in each small cluster 401, 403, 405, and 407 is then determined. If the mean of two or more of the smaller clusters 303, 305, and 307 is sufficiently close in value, then those clusters may be put back together to form one cluster. FIG. 5 is an illustration of an example in which clusters 401, 403, and 407 of FIG. 4 have been combined to form yet another new cluster 501 including positions 500 from which error estimates have been made. Accordingly, clusters having relatively complex shapes can be formed using clusters having relatively simple shapes. Having more error estimates taken at different positions within a cluster provides more opportunities to reshape the clusters.

The measurements taken within a cluster will typically have differing amounts of error. The set of error values form an array associated with a particular beacon 103 within a particular cluster. The values within the array will vary about a mean value within some range. In the terms of statistics, one way to characterize the size of the range in this variation is to calculate the "variance" of the array. Alternatively, the size of the range can be characterized by the "deviation" of the array.

Alternatively, the boundaries of a cluster can be determined based upon the value of the error estimates of the pseudo ranges measured. In this case, the variation in the error estimates included in the array is minimized. The area within a cluster is defined such that variations in the error estimates that have been made by position determination terminals 105 within the cluster are within a predetermined range. If a measurement is outside of the predetermined range, then the shape of the cluster is altered to remove the offending position. This results in greater accuracy in determining the correction to be applied to measurements taken by the less accurate position determination sub-system. This is particularly valuable when it is necessary to rely on at least one measurement from the less accurate sub-system in order to determine the position of the terminal 105.

Once a new variance and mean are calculated for the array associated with the particular cluster in which the terminal 105 is located, the new variance and mean replace the old (STEP 217). In the case in which no previous values for the variance and mean had been calculated, the error itself would be the mean and the variance would be equal to zero. Each newer error value associated with that cluster would then be placed into the array of older values. In one embodiment of the presently disclosed method and apparatus, the entire array is maintained within the MSD. Alternatively, only the new variance, mean, and number of elements in the array are maintained. It should be noted that in order to update the variance and mean of the error associated with that cluster the entire array must be available. Alternatively, the mean, variance, and the number of elements in the array must be known. By updating the mean, variance, and number of elements in the array each time a terminal 105 makes a measurement, the MSD is dynamically generated.

Alternatively, the values of all of the elements in the array are stored in the MSD. The values for the mean and variance can be calculated as needed from the stored array elements, rather than being calculated after each measurement is made. It should be noted that in accordance with one embodiment of the disclosed method and apparatus, the mean and variance can be weighted by giving more significance to certain elements in the array. In accordance with one such embodiment, the elements that are given more weight are those elements that are known to be more reliable for one reason or another. For example, if a terminal 105 makes a pseudo range measurement based on a relatively weak received signal, the weight of such a pseudo range measurement might be reduced with respect to other measurements made from stronger signals.

Furthermore, it should be noted that in accordance with one embodiment of the presently disclosed method and apparatus, it can be assumed that there is essentially no correlation between the errors in the satellite pseudo range measurements and the errors in the beacon pseudo range measurements. Therefore, in light of this assumption, the satellite errors (i.e., the errors in the position determined using the satellite pseudo range measurements) will typically not bias the mean of the errors in a cluster. However, in accordance with another embodiment of the presently disclosed method and apparatus, no such assumption is made.

Figure 6:
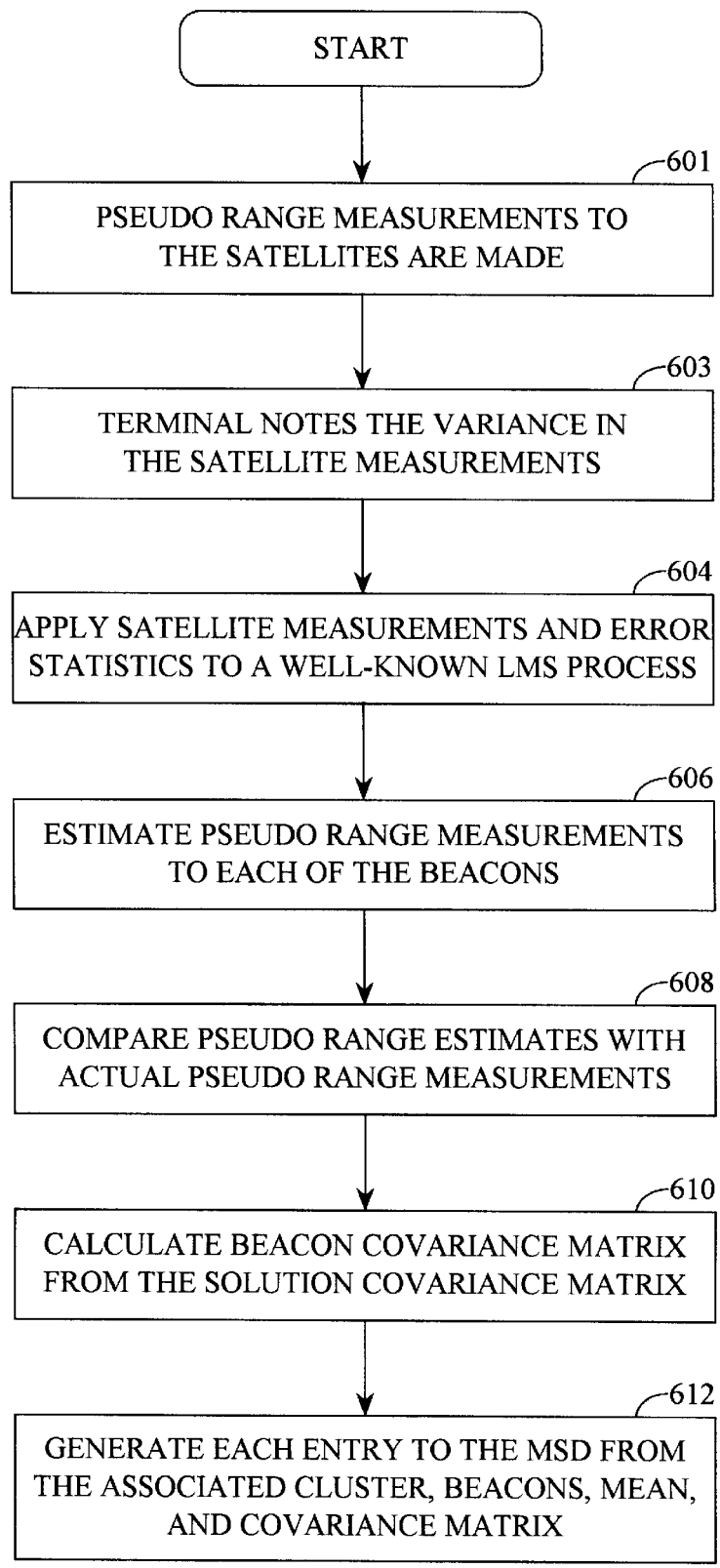
FIG. 6 illustrates the process for building an MSD in the case in which there is no assumption regarding the errors in the satellite measurements.

FIG. 6 illustrates the process for building an MSD in the case in which there is no assumption regarding the errors in the satellite measurements, as described below.

Pseudo range measurements to the satellites 101 are made by the terminal 105 (STEP 601). In addition, the terminal notes the variance in the satellite measurements (STEP 603). That is, since the measurements will have a certain amount of error, the measurements will vary about a mean within some range. This variation is characterized by calculating the variance in the error in the satellite measurements. Alternatively, the errors can be characterized by their deviation. The variance (or deviation) and the mean in the errors in the satellite measurements are typically known. In general, the variance and means are provided in a covariance matrix associated with the each satellite 101, as is well known in the art.

The satellite measurements and the error statistics associated with the satellite measurements (typically in the form of the covariance matrix) are applied to a well-known LMS process (STEP 604). In addition, in one embodiment of the disclosed method, the satellite geometry is also taken into account by the LMS process. The result of applying the satellite measurements, the error statistics associated with those measurements, and the satellite geometry to the LMS process is a position determination solution. The position determination solution provides the position of the terminal 105 from which the pseudo range measurements were taken. In addition, the LMS process results in a solution covariance matrix that indicates the error statistics regarding the amount of error in the solution. Such solution covariance matrices are well know in the art. The means are assumed to be zero due to the fact that there is assumed to be no multipathing errors in the signals received from the satellites.

The solution is presented in the form x, y, z, and b, where x, y, and z are the Cartesian coordinates of the terminal 105 with respect to a selected reference, such as the center of the earth, and b is the bias of the clock in the terminal 105 with respect to true GPS time. From the position determination solution, an estimate can be made of the pseudo range measurements to each of the beacons 103 from which the terminal 105 is receiving position determination signals (STEP 606). The pseudo range estimates can then be compared with actual pseudo range measurements taken by the terminal 105 to each beacon 103 (STEP 608) to determine the difference between them. This difference is assumed to be an estimate of the error in the measured pseudo ranges. In addition, a beacon covariance matrix can be calculated from the solution covariance matrix (STEP 610). The beacon covariance matrix characterizes the amount of error in each of the calculated error estimates based upon the amount of error in the satellite pseudo range measurements, as determined from the satellite covariance matrix. That is, estimates of the error in the beacon pseudo range measurements are based on the assumption that the calculated pseudo ranges are perfectly accurate. However, the statistics of the error is known for the satellite measurements used to derive the calculated pseudo ranges. Therefore, there is an error in the estimates of the amount of error in the beacon pseudo ranges. The statistics of the error in the en-or estimates can be determined from the solution covariance matrix, which is in turn calculated from the satellite covariance matrix. This can be done in accordance with methods well known to those skilled in the art.

In accordance with this embodiment of the presently disclosed method and apparatus, the MSD is generated such that each entry to the MSD is associated with a cluster, a group of beacons, the mean of the array of pseudo range measurement error estimates to each beacon, and the beacon covariance matrix that characterizes the error in each measurement of the pseudo range due to the errors introduced by multipathing (STEP 612). Alternatively, each entry includes identification of an associated cluster, identification of an associated beacon, an array of pseudo range measurement error estimates associated with the beacon, and beacon covariance matrix for the associated beacon. It should be noted that it may not be possible to determine the covariance between beacons associated with different entries. Accordingly, if there is only one beacon associated with an entry, then it may not be possible to determine the covariance matrix for that entry. As noted above, in accordance with one embodiment of the presently disclosed method and apparatus, the error estimates of the array are weighted according to the reliability of each such estimate.

It should be understood that by selecting clusters that cover a larger amount of area, the variance within each cluster will typically become greater. This is due to the more diverse conditions that would exist in a larger cluster. However, the advantage of having relatively large clusters is that less data is required (i.e., fewer points per square kilometer) to accurately determine the variance and mean of the error within the cluster.

Once the variance and mean of the errors associated with a particular beacon within a cluster are known, these values can be used. In particular, they are used to estimate the error in pseudo ranges to the particular beacons 103 when the pseudo range measurements are being made by a terminal 105 within the cluster. The estimates of the error in the beacon pseudo range measurements can then be used to correct the measured beacon pseudo ranges. This is particularly useful when there are too few satellite pseudo range measurements. Accordingly, if there are not enough satellites available to make a position determination based on satellite measurements alone, then corrected pseudo ranges to beacons 103 can be used.

It should be understood that the presently disclosed method and apparatus assumes that the MSD will be generated and stored within the terminal 105. However, the MSD may be generated and stored within a beacon or other component remote from the terminal 105. For example, it will be clear to those skilled in the art that the terminal 105 may be responsible only for taking pseudo range measurements. These measurements are then transmitted to the beacon 103. The beacon 103 then processes the pseudo range measurements as described above in a device 104 within the beacon 103. Alternatively, the device 104 is remote from the beacon 103 and the beacon 103 communicates the pseudo range measurements to the remote device 104. The remote device 104 then processes the pseudo range measurements. It should be understood that the processing may be distributed such that some of the processing is performed in one device and other processing is performed in other devices. Nonetheless, without regard for which device is responsible for performing which process, the disclosed method will be performed essentially as defined above.

Figure 7:
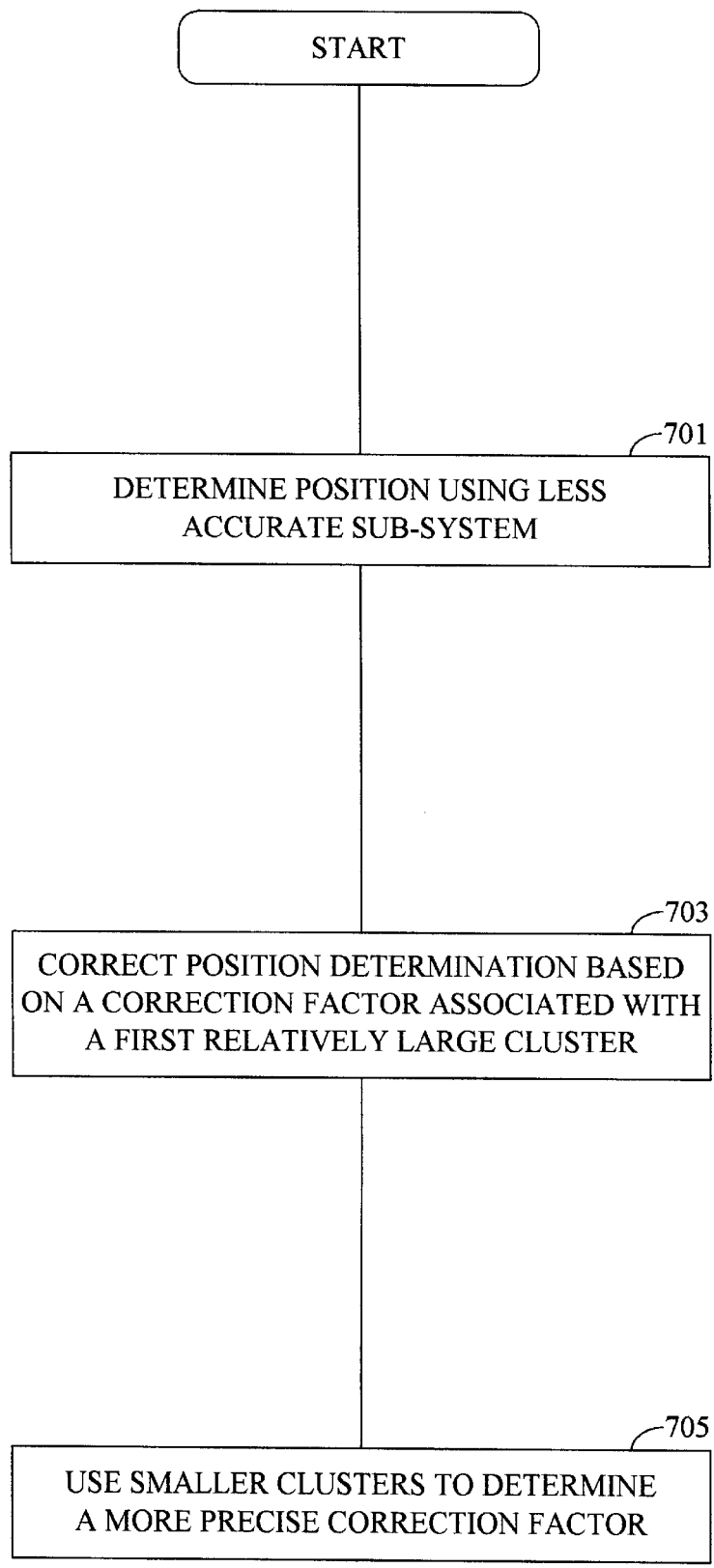
FIG. 7 is a simplified block diagram of one embodiment of an iterative process for correcting errors in position determinations.

As contemplated above, the present method and apparatus provides a means by which a position determination from a less accurate position determination sub-system can be connected in a single correction step. However, in an alternative embodiment of the process described above, an iterative process can be performed as shown in FIG. 7 and described below.

Initially, the position of a terminal 105 is determined using a less accurate subsystem (STEP 701). That determination is then connected based on a correction factor associated with a first relatively large cluster (STEP 703). The first cluster is intentionally made to be relatively large to account for the fact that the error that is present in the less accurate sub-system's initial estimate of the position may be great enough to make it difficult to accurately determine which cluster the terminal 105 is in if the cluster is made to small. Once the correction to the position is made using the correction factor from the first relatively large cluster, the position of the terminal 105 will be known to a greater accuracy. Smaller clusters are then used to determine a more precise correction factor (STEP 705), since the improvement in accuracy provided by the first correction will make it possible to determine in which smaller cluster the terminal 105 current resides.

It should be understood that the presently disclosed method and apparatus could be used with position determination systems other than hybrid position determination systems if there is some other means by which to determine the position of the terminal is available at some times or locations, but not at others. In this case, the position of the terminal would be used as a reference to determine the amount of error in the pseudo range measurements in the same way that the position determination from the more accurate sub-system described above is used.

Apparatus Used to Implement one Embodiment of the Presently Disclosed Method

Figure 8:
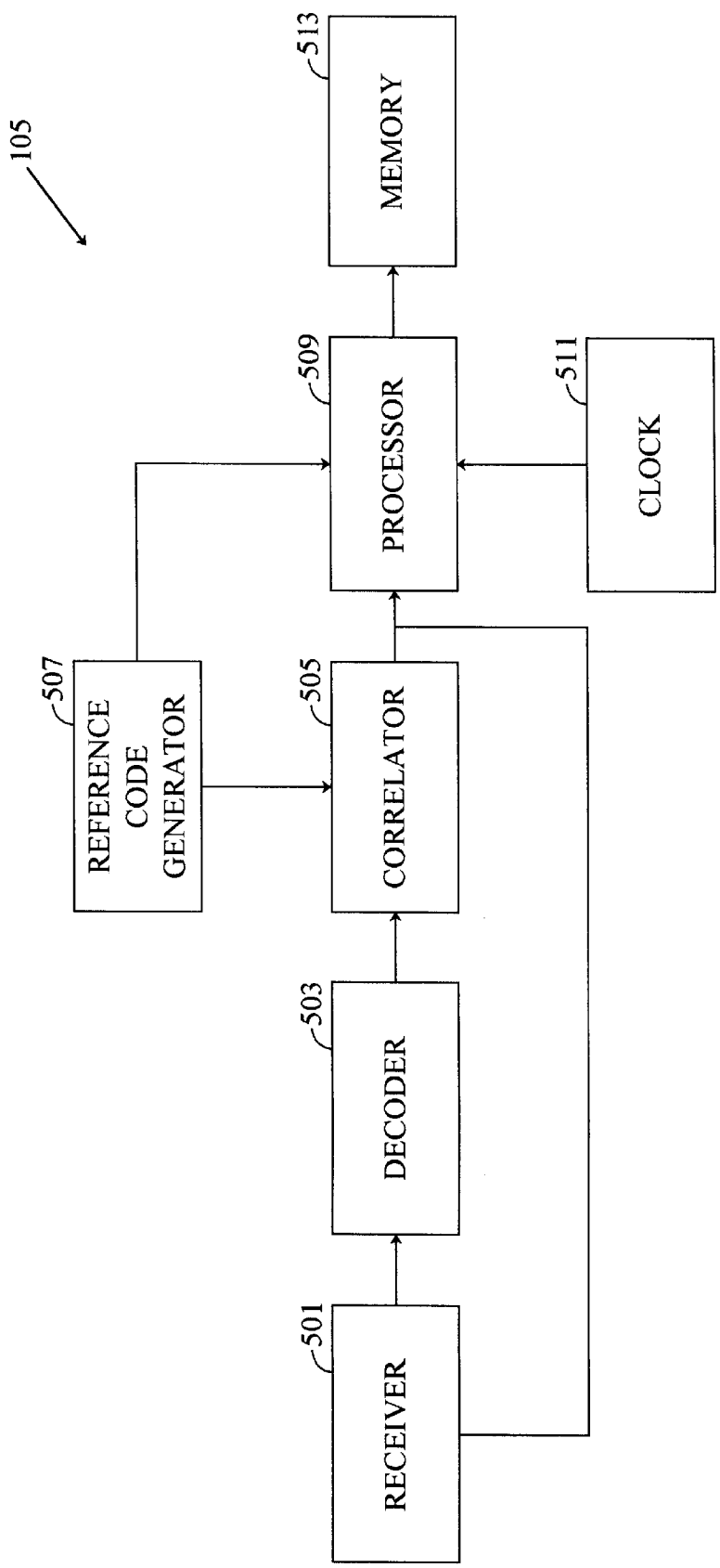
FIG. 8 is a simplified block diagram of one embodiment of a terminal used to implement the presently disclosed method.

FIG. 8 is a simplified block diagram of one embodiment of a terminal 105 used to implement the presently disclosed method. The terminal 105 includes a receiver 501, a decoder 503, a correlator 505, a reference code generator 507, a processor 509, a clock 511, and a memory 513. The receiver 501 typically includes a conventional radio frequency front end section, including antenna, down converter, filters, amplifiers, etc., all of which are well known and for simplicity sake are not shown. Signals, including position determination signals, are received by the receiver 510. The received signals are down-converted, filtered, and amplified (not necessarily in that order) as required for input to the decoder 503. It will be understood by those skilled in the art that other processing not disclosed herein may occur in the receiver 501, but is essentially immaterial to the novel aspects of the presently disclosed method and apparatus.

The output from the receiver 501 is coupled to the decoder 503. The decoder 503 decodes the intelligence from the received signal. When position determination signals are received and decoded, the output from the decoder will be a code sequence. The decoded intelligence is coupled to the correlator 505. The correlator 505 is also coupled to the reference code generator 507. The reference code generator 507 provides a reference code sequence to the correlator 505 to allow the correlator 505 to identify a predetermined point in the received code sequence. The correlator 505 outputs a signal to the processor 509 indicating, when the reference code sequence and the received code sequence are synchronized. The reference code generator 507 is also coupled to the processor 509. Once the reference code sequence and the received code sequence are synchronized, the output from the reference code generator 507 to the processor 509 allows the processor 509 to determine the timing of the received code sequence.

The clock 511 is also coupled to the processor 509. The clock 511 may be either free running or synchronized to an external clock reference. If the clock is synchronized to an external clock reference, then the timing of the received code sequence can be determined with respect to the external clock reference. The processor 509 is also coupled to the receiver 501. The receiver 501 provides the processor 509 with information as to which frequency the receiver 501 is be tuned.

In accordance with one type of received signal, the processor 509 receives information from the timing of the received code sequence that, together with the frequency on which the signal was received, is indicative of the particular transmitter 101, 103 from which the code sequence originated. It should be noted that multiple correlators 505 may be used to concurrently correlate multiple signals. The processor 509 takes all of the information that is provided to it and determines the relative timing i.e., the pseudo ranges) of all of the signals received. In addition, the processor 509 performs all of the pseudo range processing functions described above.

One application for the presently disclosed method and apparatus allows more accurate production of a "sector coverage map". A sector coverage map is a map that shows which geographic regions are being served by a particular sector of a beacon 103. Beacons 103 are said to be sectorized (i.e., serve a plurality of sectors) when separate antennas are used to direct the signals transmitted by the server to a particular geographic sector and to receive signals from that particular geographic sector. Typically, the sectors at issue are assumed to be essentially pie shaped wedges emanating out from the beacon 103. It is common for cellular base stations to be constructed with three such sectors, each sector forming a non-overlapping pie shaped wedge with a width of 120 degrees. However, due to several factors, sectors of a beacon 103 may in fact, receive signals from, and transmit signals to, areas that would not typically be assumed to be within the sector. Accordingly, a sector coverage map allows both a terminal 105 and a beacon 103 to determine which sector of the beacon 103 is servicing the terminal 105.

A sector coverage map is generated in accordance with the presently disclosed method and apparatus by associating (1) the sector in which the beacon 103 receives signals from the terminal 105, (2) the position of the terminal 105 as determined by the more accurate position determination sub-system, and (3) the position of the terminal 105 as determined by the less accurate position determination sub-system. Accordingly, a sector coverage map generated as indicated above can be used together with knowledge of the position of the terminal, as determined by the less accurate subsystem, to more reliably attain the sector of the beacon 105 that is servicing the terminal. This is particularly useful when more than one sector receives signals from a terminal 105. This is even more useful when more than one sector is reporting service to the terminal 105 and the position determined by the less accurate position determination sub-system determines that the terminal 105 is not in any of the sectors that are reporting that they are serving the terminal 105.

The previous description of the preferred embodiments of the disclosed method and apparatus is provided to enable any person skilled in the art to make or use the present invention recited in the claims presented below. Various modifications to these embodiments can be made without extending beyond the scope of the invention claimed below. Accordingly, it should be recognized that the principles disclosed herein may be applied to other undisclosed embodiments of the disclosed method and apparatus without extending beyond the scope of the invention recited in the claims provided below. The present invention is not intended to be limited to the embodiments shown herein, but is instead intended to be accorded the widest scope consistent with claims provided below.

What is claimed is:

1. A method for determining an error estimate, including the steps of:
   a) determining the position of a mobile terminal using a first sub-system;
   b) calculating pseudo ranges to at least one transmitter within a second sub-system using the determined position;
   c) measuring pseudo ranges to the at least one transmitter within the second sub-system; and
   d) comparing the calculated and measured pseudo ranges for the at least one transmitter to determine an error estimate.

2. The method of claim 1, wherein the first position determination sub-system typically determines the position of a terminal with more accuracy than the second sub-system.

3. A method for using an aggregate value to correct a pseudo range measurement made by a position determination sub-system, including the steps of:
   a) determining a set of error estimates associated with a cluster, each error estimate within the set representing the error in a pseudo range to at least one transmitter, and each pseudo range being measured by a mobile receiver from a position within the cluster;
   b) calculating an aggregate value for the set of error estimates; and
   c) using the aggregate value to correct for errors in additional pseudo ranges measured within the cluster.

4. The method of claim 3, wherein the aggregate value is calculated by calculating the mean of the set of error estimates.

5. The method of claim 4, wherein the set of error estimates is weighted before calculating the mean.

6. The method of claim 5, wherein the weighting is done based upon the relative reliability of each error estimate.

7. The method of claim 3, further including the steps of:
   a) associating a cluster with a range of values of a parameter; and
   b) determining that an error estimate is associated with the cluster if a value of the parameter determined by a terminal to which a pseudo range associated with the error estimate is taken is within the range.

8. The method of claim 1, further including the steps of:
   a) determining error estimates associated with pseudo ranges to at least one transmitter from several positions;
   b) defining the scope of a cluster such that variations in the error estimates that have been made by position determination terminals within the cluster are within a predetermined range.

9. A method for determining an error estimate in a first sub-system using information provided by a second sub-system, including the steps of:
   a) determining the position of a position determination mobile terminal using the second sub-system;
   b) determining second sub-system error statistics regarding the amount of error in the determined position;
   c) calculating first sub-system pseudo ranges to at least one transmitter using the determined position;
   d) determining from the second sub-system error statistics, error statistics for the calculated first sub-system pseudo ranges;
   e) measuring first sub-system pseudo ranges; and
   f) comparing the calculated and measured first sub-system pseudo ranges to determine an error estimate.

10. The method of claim 9, wherein the first position determination sub-system typically determines the position of a terminal with more accurate than the second sub-system.

11. The method of claim 9, further including the steps of:
    a) determining at least one set of error estimates from several positions within a cluster in accordance with the method recited in claim 9, each error estimate of the same set being associated with the same beacon and having been taken by a terminal within the same cluster;
    b) calculating an aggregate value for at least one set of error estimates; and
    c) using the aggregate value to correct for errors in subsequent measurements of pseudo ranges taken within the cluster and associated with the same beacon to which the aggregate value is associated.

12. The method of claim 11, wherein the aggregate value is calculated by calculating the mean of the set of error estimates.

13. The method of claim 12, wherein the set of error estimates is weighted before calculating the mean.

14. The method of claim 13, wherein the weighting is done based upon the relative reliability of the calculated pseudo ranges used to determine the position of the position determination terminal.

15. The method of claim 11, further including the steps of:
   a) associating a cluster with a range of values of a parameter; and
   b) determining that a position determination terminal is within a cluster if the value of the parameter for the position determination terminal is within the range of values associated with that cluster.

16. The method of claim 11, further including the steps of:
   a) determining error estimates associated with pseudo ranges to at least one transmitter from several positions; and
   b) defining the scope of a cluster such that variations in the error estimates that have been made by position determination terminals within the cluster are within a predetermined range.

17. A method for correcting errors in a pseudo range measurement, including the steps of:
   a) measuring, at a mobile receiver, pseudo ranges to beacons;
   b) measuring the value of a parameter;
   c) determining the amount of correction to apply to the measured pseudo ranges to each beacon based upon a predetermined relationship between the value of the parameter and the correction factor to be applied; and
   d) applying the determined amount of correct to each of the measured pseudo ranges.

18. A method for correcting errors in a pseudo range measurement, including the steps of:
   a) measuring, at a mobile receiver, pseudo ranges to a particular beacon;
   b) measuring the value of a parameter;
   c) determining the amount of correction to apply to the measured pseudo ranges based upon the particular beacon, a predetermined relationship between the value of the parameter and the correction factor to be applied for the particular beacon; and
   d) applying the determined amount of correct to each of the measured pseudo ranges.

19. The method of claim 18, wherein the parameter is a position of the terminal as determined from uncorrected pseudo range measurements.

20. A method for correcting errors in a pseudo range measurement, including the steps of:
   a) measuring at a mobile receiver pseudo ranges to a particular beacon;
   b) measuring the value of a parameter;
   c) determining which cluster a terminal current resides in based upon the value of the measured parameter;
   d) determining the amount of correction to apply to the measured pseudo ranges to the particular beacon based upon the cluster in which the terminal resides; and
   e) applying the determined amount of correct to each of the measured pseudo ranges to the particular beacon.

21. A method for generating a sector coverage map, including the steps of:
   a) determining the position of a mobile terminal using a first position determination sub-system, the first position determination sub-system being independent of the any pseudo range measurements to the beacons;
   b) determining which sectors of a beacon are servicing the terminal; and
   c) for each sector, creating a sector coverage map that indicates each of the positions, determined by the satellite position determination sub-system, from which a sector can provide service to a terminal.

22. The method of claim 21, further including the steps of:
   a) determining the position of the terminal using a second position determination sub-system while the terminal remains at the position from which the position was determined by the first position determination sub-system; and
   b) associating the location determined by the second position determination system with the location determined by the first position determination sub-system.

23. A computer readable medium encoded with a data structure for determining in which particular sector of a beacon a terminal resides, including:
   a) a first list of positions associated with a particular sector, of a beacon, each such position having been determined by a first position determination sub-system, from which a terminal may be serviced by the associated sector; and
   b) a second list of positions associated with the particular sector, each such position having been determined by a second position determination sub-system, from which a terminal may be serviced by a particular sector associated with the list of positions.

24. A computer readable medium encoded with a data structure for determining a correction factor to be applied to a pseudo range measurement taken by a first mobile receiver within a position determination sub-system, including:
   a) a set of error estimates to be used to correct a pseudo range measurement to an associated beacon; and
   b) an indication associated with the set of error estimates for identifying the associated beacon.

25. A computer readable medium encoded with a data structure, for determining a correction factor to be applied to a pseudo range measurement taken by a first position determination sub-system, including:
   a) an aggregate en-or estimate to be used to correct a pseudo range measurement to an associated beacon, the aggregate error estimate having been calculated from a set of error estimates, each error estimate within the set of error estimates having been calculated from the difference between a measured and a calculated pseudo range to the associated beacon; and
   b) an indication associated with the aggregate error estimate for identifying the associated beacon.

26. The computer readable medium of claim 24, further including an indication identifying a cluster that is associated with the aggregate error estimate.

27. The computer readable medium of claim 25, further including statistics for characterizing the amount of error in the error estimates.

28. The computer readable medium of claim 27, wherein the statistics include a covariance matrix.

29. The computer readable medium of claim 27, wherein the statistics include a mean of the set of error estimates.

30. The computer readable medium of claim 29, wherein the statistics include a variance of the set of error estimates.

* * * * *